US005626910A

United States Patent [19]

Tanabe et al.

[11] Patent Number: 5,626,910
[45] Date of Patent: May 6, 1997

[54] SURFACE-MODIFIED MOLDED PRODUCT OF SYNTHETIC RESIN AND PROCESS FOR PRODUCING IT

[75] Inventors: Yasuo Tanabe, Tokyo; Koshi Sasaki, Kawasaki; Hidehiko Ohara, Yokohama; Naoshi Imaki, Atsugi, all of Japan

[73] Assignee: Mitsubishi Chemical Corporation, Tokyo, Japan

[21] Appl. No.: 379,768

[22] Filed: Jan. 27, 1995

Related U.S. Application Data

[63] Continuation of Ser. No. 103,684, Aug. 10, 1993, abandoned.

[30] Foreign Application Priority Data

Aug. 10, 1992 [JP] Japan ..................... 4-234231
Mar. 23, 1993 [JP] Japan ..................... 5-064297

[51] Int. Cl.$^6$ ..................................................... C23C 16/00
[52] U.S. Cl. ................... 427/255.1; 427/248.1; 427/255.6; 427/255.4; 428/500; 428/522; 525/199; 525/221; 525/227; 525/356; 525/355
[58] Field of Search .................. 427/255.1, 255.6, 427/248.1, 255.4; 525/199, 227, 356, 355, 221; 428/500, 522

[56] References Cited

U.S. PATENT DOCUMENTS

| 3,567,521 | 3/1971 | Toy et al. | 148/6.3 |
| 3,674,667 | 7/1972 | Manion et al. | 204/165 |
| 4,076,916 | 2/1978 | Lagow | 526/43 |
| 4,296,151 | 10/1981 | Boultinghouse | 427/255.1 |

FOREIGN PATENT DOCUMENTS

| 0231918 | 8/1987 | European Pat. Off. . |
| 0300385 | 1/1989 | European Pat. Off. . |
| 125133 | 4/1977 | Germany . |

*Primary Examiner*—Paul J. Thibodeau
*Assistant Examiner*—Mary Critharis
*Attorney, Agent, or Firm*—Oblon, Spivak, McClelland, Maier & Neustadt, P.C.

[57] ABSTRACT

A process for producing a surface-modified molded product of synthetic resin, which comprises contacting a fluorine-containing gas to the surface of a molded product of synthetic resin and then contacting a polymerizable monomer to form a new polymer layer on the surface of the molded product.

6 Claims, No Drawings

SURFACE-MODIFIED MOLDED PRODUCT OF SYNTHETIC RESIN AND PROCESS FOR PRODUCING IT

This application is a continuation of application Ser. No. 08/103,684, filed on Aug. 10, 1993, now abandoned.

The present invention relates to a surface-modified molded product of synthetic resin and a process for producing it. More particularly, it relates to a process for modifying the surface of a molded product of synthetic resin by coating the surface with a polymer having functional groups. According to the present invention, it is possible to impart to the surface of a molded product of synthetic resin new functions such as water or oil repellency, sliding property, hydrophilic or lipophilic property, chemical resistance, heat resistance, electrical conductivity and electrical insulating property by introducing to the surface fluorine-containing, oxygen-containing or nitrogen-containing functional groups, or various other functional groups obtained via such functional groups.

As a method for forming a polymer on the surface of a molded product of synthetic resin, a coating method, a physical modification method by means of a physical energy such as plasma treatment, or a chemical modification method wherein a highly concentrated gas of e.g. fluorine is applied, or radiation of e.g. γ-rays or light is applied to form radicals and thereby to form graft chains.

However, the plasma treatment requires a vacuum condition, whereby it is difficult to continuously treat a large sized material, and the cost for the apparatus is high. Thus, this method is not suitable as a simple common treatment method.

The coating method has difficulties such that no adequate adhesion is likely to be obtained, thin film treatment is difficult, and the process tends to be complicated as washing and drying steps are required due to the wet treatment.

The method of applying a highly concentrated gas of e.g. fluorine has difficulties such that the synthetic resin is likely to be destroyed due to the high heat of reaction, and local heating is unavoidable, whereby a reproducible uniform polymer layer can hardly be formed.

Further, the method employing the radiation or the irradiation with light has difficulties such that it is difficult to uniformly irradiate the surface of the resin substrates having various shapes, and the cost of the apparatus is high.

The present invention has been made under the above described circumstances, and it is an object of the present invention to provide a process for producing a surface-modified molded product of synthetic resin, which is capable of forming a polymer layer having various functional groups in a uniform thickness of any desired level on the surface of a wide range of synthetic resin materials by a simple process requiring no special apparatus and under a mild condition.

The present invention provides a process for producing a surface-modified molded product of synthetic resin, which comprises contacting a fluorine-containing gas to the surface of a molded product of synthetic resin and then contacting a polymerizable monomer thereto to form a new polymer layer on the surface of the molded product.

Now, the present invention will be described in detail with reference to the preferred embodiments.

The synthetic resin to which the present invention can be applied, is preferably the one having hydrocarbon sites capable of reacting with the fluorine-containing gas. As such a synthetic resin, the following synthetic resins (1) to (3) may, for example, be mentioned.

(1) Thermoplastic resins wherein the polymer main chain is formed by a C—C bond.

Various polyolefins such as polyethylene, polypropylene, polystyrene, polyvinyl chloride, polyvinylidene chloride, polyvinyl acetate, polyacrylate, polymethacrylate, polyacrylonitrile, polyvinyl ketone, polyvinyl ether and polybutene-1.

(2) Thermoplastic resins containing an oxygen atom or a nitrogen atom in the polymer main chain.

Thermoplastic resins such as a polyester represented by polyethylene terephthalate, polyurethane, polycarbonate, polyimide, a polyamide represented by a nylon resin, polyether, polyketone and polyacid anhydride.

(3) Thermosetting resins

Thermosetting resins such as an epoxy resin, a phenol resin, a furan resin, a urea resin and an unsaturated polyester resin.

The form of the synthetic resin may optionally be selected, for example, from films, plates, powders, fibers or molded products (pipes or containers).

In the present invention, firstly, a fluorine-containing gas is contacted to the surface of a molded product of synthetic resin. The purpose of preliminarily contacting the fluorine-containing gas to the surface of the molded product of synthetic resin is to form radical-like reactive sites to initiate the polymerization reaction of the monomer which will be described hereinafter, by the reaction of the synthetic resin with fluorine.

Accordingly, the condition for contacting the fluorine-containing gas may be substantially mild as compared with the case for direct fluorination reaction treatment. Especially with the synthetic resin having reactive sites (such as side chain alkyl groups, aromatic rings or unsaturated groups) readily reactive with fluorine, the condition for contacting the fluorine-containing gas may be mild and yet adhesion of the formed film to the substrate resin will be good.

As the fluorine-containing gas, the one prepared by diluting fluorine gas with an inert gas such as nitrogen or helium, may be employed. The concentration is not particularly limited, but is usually selected within a range of from 0.1 to 50 wt %, preferably from 1 to 20 wt %. By such a concentration of fluorine gas, it is possible to prevent the direct fluorination reaction from proceeding preferentially and yet handling of the gas will be safe.

The pressure for contacting the fluorine-containing gas may range from under reduced pressure to under elevated pressure. It is usually selected within a range of from 1 Torr to 2 atm, although it varies depending upon the concentration of fluorine gas to be used.

The fluorine-containing gas may hereinafter be referred to simply as fluorine gas.

The temperature for contacting fluorine gas is selected so that the direct fluorination reaction will not preferentially proceed, and such a temperature range is usually from −70° to 200° C., preferably from −70° to 90° C., most preferably from 0° to 80° C.

The time for contacting fluorine gas is suitably selected within a wide range, and it is usually from one second to ten days, preferably from one minute to three hours.

The conditions outside such ranges may suitably be selected in a case where the process can be properly conducted under such conditions, by a judgement by a person skilled in the art.

Then, a polymerizable monomer is contacted to the surface of the molded product of synthetic resin contacted with fluorine gas. By the action of such a monomer, a polymerization reaction takes place on the surface of the synthetic resin, whereby a polymer film will be formed.

As the monomer, the one in a gaseous state or in a liquid state may be employed, but the one which can be handled in a gaseous state is preferred, since the post treatment after forming the polymer layer will thereby be easy.

The monomer to be used in the present invention, is preferably a radical polymerizable monomer with the Alfrey-Price's value e as an index of the reactivity of the monomer being defined by 1.7>e>−1.0. Examples of such a monomer with the value e being defined by 1.7>e >−1.0 are disclosed, for example, in "Polymer Data Handbook" published by Baifukan (1986). The following monomers may, for example, be mentioned.

(1) Olefins

For example, acenaphthylene, sodium ethylenesulfonate, butyl ethylenesulfonate, p-oxathiene, N-(2-chloroethyl) ethylenesulfonamide, chlorotrifluoroethylene, 2-chloro-1-propylene, 3-chloro-1-propylene, cyclopentene-1,3-dione, 2-vinylnaphthalene, 1,3-butadiene-1-carboxylic acid, 2,3-epoxypropyl 1,3-butadiene-1-carboxylate, tert-butylisopropenylketone, propylene, hexachloro-1,3-butadiene and 1-hexene.

(2) Flurine-Containing Olefins

For example, tetrafluoroethylene, hexafluoropropylene, vinylidene fluoride, vinyl fluoride, 3,3,3-trifluoropropylene, 1,3,3,3-tetrafluoropropylene, octafluoroisobutylene, 2-hexafluoro-1,3-butadiene and chlorotrifluoroethylene.

(3) Styrene and its Derivatives

For example, p-acetoxystyrene, p-acetyl-α-methylstyrene, α-acetoxystyrene, o-chlorostyrene, m-chlorostyrene, p-chlorostyrene, p-chloromethylstyrene, p-cyanostyrene, β,β-difluorostyrene, α-(difluoromethyl) styrene, 2,4-dibromostyrene, butyl ethylenesulfonate, cis-stilbene, trans-stilbene, p-nitrostyrene, p-phenylstyrene, p-fluorostyrene, β-fluorostyrene, p-tert-butylstyrene, p-bromostyrene, p-benzoylstyrene, 2,3,4,6-chlorostyrene, 2,3,4,5,6-pentafluorostyrene and p-iodostyrene.

(4) Vinyl Halides

For example, vinylidene chloride, vinyl chloride, vinyl bromide and vinyl iodide.

(5) Vinyl Esters

For example, vinyl benzoate, vinyl isocyanate, p-vinylphenyl isocyanate, vinyl isothiocyanate, vinyl formate, vinyl p-cholorobenzoate, vinyl chloroacetate, vinyl cinnamate, vinyl acetate, vinyl p-cyanobenzoate, ethylvinyl oxalate, vinyl dichloroacetate, divinyl carbonate, vinyl trichloroacetate, vinyl trifluoroacetate, p-vinylbenzoate, p-vinylbenzoic acid chloride, vinyl propionate, vinyl pentafluoroacetate and vinyl α-methoxybenzoate.

(6) Vinyl Pyridines

For example, 2-isopropenylpyridine, 2-vinylpyridine, 4-vinylpyridine and 2-vinylpyridine oxide.

(7) Acrylic Acid Derivatives

For example, acrylamide, isopropyl acrylate, ethyl 2,3-oxypropyl acrylate, octadecyl acrylate, p-cresyl acrylate, acrylic acid chloride, 2-chloroethyl acrylate, p-chlorophenyl acrylate, cyclododecyl acrylate, 6,8-dimethyl-4-oxochromanimethyl acrylate, 2,4,6-trichlorophenyl acrylate, sodium acrylate, 2-nitrobutyl acrylate, 2-hydroxyethyl acrylate, 2-hydroxypropyl acrylate, phenyl acrylate, ferrocenylmethyl acrylate, butyl acrylate, p-bromophenyl acrylate, propyl acrylate, benzyl acrylate, methyl acrylate, 1-acryloylaziridine, N-acryloyl pyrrolidone, 1-acryloyl 2-benzoylhydradine, acrylonitrile, acrolein, ethyl α-actoxyacrylate, α-acetoxyacrylonitrile, methyl α-ethyl acrylate, ethyl β-ethoxy acrylate, N-octylacryloamide, methyl α-chloroacrylate, α-chloroacrylonitrile, α-chloroacrolein, 3-(2-chloroethyl)-6-acryloyloxypyridazinone, methyl-α-cyanoacrylate, N,N-dibutylacryloamide, N,N-dimethylacrylamide, methyl thioacrylate, N-(hydroxymethyl)acrylamide, methyl α-fluoroacrylate, ethyl α-fluoromethylacrylate, acrylic anhydride and α-methoxyacrylonitrile.

(8) Methacrylic Acid Derivatives

For example, 1,2-dimethacryloyloxyethane, N-phenylmethacrylamide, methacrylic anhydride, methacrylamide, methacrylic acid, zinc methacrylate, 2-acetoxyethyl methacrylate, isopropyl methacrylate, ethyl methacrylate, 2,3-epoxypropyl methacrylate, octafluoropentyl methacrylate, methacrylic acid chloride, 2-chloroethyl methacrylate, chloromethyl methacrylate, dodecyl methacrylate, 2-nitropropyl methacrylate, cyclohexyl methacrylate, phenyl methacrylate, furfuryl methacrylate, methacrylic acid fluoride, propyl methacrylate, benzyl methacrylate, methyl methacrylate, methacrylonitrile, methacrolein and N-methylmethacrylamide.

(9) Dienes

For example, 2-acetoxy-3-methyl-1,3-butadiene, butadiene, isoprene and chloroprene.

(10) Others

For example, methyl atropate, atroponitrile, N-allyl acetamide, allyl alcohol, 2-allyl pyrrole, allylphenyl ether, allylbenzene, N-allylbenzamide, isopropyl vinyl ketone, isopropenyl phenyl ketone, isopropenyl methyl ketone, itaconic acid, diethyl itaconate, ethyl isopropenyl ketone, ethyl vinyl ketone, ethylvinyl sulfide, ethylvinyl sulfoxide, octadecylvinyl ether, crotonaldehyde, methyl crotonate, crotonnitrile, N-(2-chloroethyl)itaconimide, methyl p-chlorocinnamate, allyl chloroacetate, chloroprene, chloromethyl vinyl ketone, phenyl cinnamate, tert-butyl cinnamate, benzyl cinnamate, methyl cinnamate, isopropenyl acetate, cinnamonitrile, diphenylvinyl phosphine, diphenylvinyl phosphine oxide, methyl solvate, solvonitrile, vinylene carbonate, triethoxyvinyl silane, tributylvinyl tin, trimethylvinyl german, trimethylvinyl silane, trimethyl (p-vinylphenyl)silane, 5-vinylisooxazole, 1-vinylimidazole, 2-vinylthiophene, 2-vinylphenanthrene, m-vinylphenol, p-vinylbenzenesulfonamide, p-vinylbenzamide, diethyl vinylphosphate, phenylvinyl ketone, phenylvinyl sulfone, α-phenylvinylphosphoric acid, diallyl phthalate, diethyl fumarate, diisopropyl fumarate, pentafluorophenylvinylsulfide, muconic acid, diethyl muconate, dicyclohexyl methaconate, diphenyl methaconate, dimethyl methaconate, methylvinylsulfone and diethyl 2-methyleneglutarate.

A monomer is usually considered to be radical polymerizable when the Alfrey-Price's value e as an index of the polymerization reactivity of a monomer is 1.7>e>−1.0. On the other hand, a monomer with e>1.7 is considered to be readily susceptible to anion polymerization. Accordingly, the above-mentioned monomers are believed to have high reactivity with active sites formed by the action of fluorine gas, whereby a polymer film is satisfactorily formed. Among such monomers, particularly preferred are a fluorine-containing olefin such as tetrafluoroethylene, acrylic acid and an acrylic acid derivative such as methyl acrylate or acrylonitrile, wherein the value e is positively relatively large.

These monomers may be used alone, or two or more of them may be used in combination for copolymerization.

The pressure for contacting the monomer having various functional groups may range from reduced pressure to elevated pressure, and it is usually selected within a range of from 1 Torr to 10 atm. In order to conduct the process of the present invention industrially advantageously taking into consideration the apparatus for the reaction and the productivity and to avoid a danger of explosion, the pressure is preferably within a range of from 0.5 to 2 atm.

The temperature for contacting the monomer varies depending upon the monomer to be used. However, it is usually selected within a range of from 0° to 200° C., preferably from 20° to 90° C.

The time for contacting the monomer may be suitably selected within a wide range, and it is usually within a range of from one second to ten days, preferably from one minute to 5 hours.

The conditions outside such ranges may suitably be selected, in a case where the process can practically be carried out by a judgement by a person skilled in the art.

In the present invention, the polymerization can be terminated by contacting the polymer terminals with various gases after the polymerization reaction. The reaction conditions at such time can be selected from the same conditions as described above with respect to the conditions for the action of fluorine gas. Further, it is also possible to form a different polymer layer by using another monomer gas.

The film thickness of the polymer having functional groups, to be formed, can be controlled by such factors as the pressure of the monomer to be reacted, the temperature and the time for the reaction. It is usually possible to form a polymer layer having a thickness of from a few Å to a few hundred μm, more preferably from 1 Å to 500 μm.

The surface-modified molded product of synthetic resin of the present invention has excellent water repellency. Specifically, the surface properties can be maintained so that the contact angle with water (the water droplet contact angle) is at least 110°, preferably at least 140°.

As described above, the process for modifying a synthetic resin in the present invention is carried out under a mild condition. This merit will be described in comparison with the prior art.

For example, with respect to a method for modifying a metal surface, U.S. Pat. 3,567,521 discloses a process which comprises contacting fluorine gas to a metal surface and then contacting a fluorine-containing olefin (tetraftuoroethylene) to form teflon on the metal surface. According to Examples of this US Patent, as a condition for contacting fluorine gas, it is necessary to employ a high temperature condition at a level of from 100° to 300° C. using fluorine gas at a high concentration of almost 100% to form a metal fluoride on the metal surface, and further, as a condition for contacting the fluorine-containing olefin, it is necessary to employ a condition of 100° C. under from 3 to 4 atm.

Whereas, in the present invention, the contact of fluorine gas can sufficiently be conducted under substantially mild conditions with respect to all of the concentration, the temperature and the time, and also as the condition for contacting a fluorine-containing olefin, no pressurizing is required.

According to the present invention, the following advantages (1) to (3) will be brought about by the employment of such mild conditions.

(1) It is unnecessary to use a highly dangerous high concentration fluorine gas, whereby safety in operation is ensured.

(2) Surface modification can be conducted even at a low temperature of not higher than 100° C., whereby the process is applicable to a thermoplastic resin which requires low temperature treatment.

(3) It is possible to employ a pressure condition of not higher than an ordinary pressure, whereby even a gas which has a danger of explosion under pressure, such as tetrafluoroethylene gas, can be used under a safe condition. Avoidance of a pressure condition is advantageous also from the viewpoint of the productivity and the apparatus for reaction.

Now, the present invention will be described in further detail with reference to Examples. However, it should be understood that the present invention is by no means restricted by such specific Examples.

EXAMPLE 1

A sample of a polypropylene sheet was put into a reactor resistant to fluorine, and the reactor was evacuated under vacuum. Then, fluorine gas diluted to 5 wt % with nitrogen, was introduced to 760 Torr. The reaction system was left to stand still at room temperature for two hours. Then, fluorine gas was discharged under vacuum, and then tetrafluoroethylene (TFE) was introduced to 760 Torr. The system was left to stand still at room temperature for one hour, and then unreacted tetrafluoroethylene gas was replaced by nitrogen gas. The nitrogen gas was again discharged under vacuum. Then, in order to substitute the polymer terminals with fluorine, fluorine gas diluted to 5 wt % with nitrogen, was introduced to 360 Torr, and the system was left to stand still for 15 minutes. Finally, the fluorine gas was replaced by nitrogen. Then, the sample was taken out, and the film formed on the surface was analyzed.

The contact angle θ to water was 118°, whereby it was confirmed that a water repellent film was formed on the sample surface (θ=97°). As a result of the XPS analysis, a peak (292 eV) attributable to $(CF_2)_n$ was observed, whereby it was confirmed that the formed water repellent film had a polytetrafluoroethylene structure, and its film thickness was at least 50 Å.

EXAMPLES 2 TO 5

Surface treatment of various synthetic resin samples as identified in Table 1 was conducted in the same manner as in Example 1. In each case, a water repellent polytetrafluoroethylene film was formed. The results of measurement of the contact angles θ to water are shown in Table 1.

EXAMPLE 6

A sample of a polypropylene sheet was put into a reactor resistant to fluorine, and the reactor was evacuated under vacuum. Then, fluorine gas diluted to 10 wt % with nitrogen, was introduced to 760 Torr. The reaction system was left to stand stil at room temperature for one hour. Then, the fluorine gas was discharged under vacuum, and then tetrafluoroethylene gas was introduced to 760 Torr. The system was left to stand stil at 70° C. for one hour. Then, it was returned to room temperature, and unreacted tetrafluoroethylene gas was replaced by nitrogen gas. The nitrogen gas was again discharged under vacuum. Then, to substitute the polymer terminals with fluorine, fluorine gas diluted to 10 wt % with nitrogen, was introduced to 360 Torr, and the system was left to stand stil for 15 minutes. Finally, the fluorine gas was replaced by nitrogen, the sample was withdrawn, and the film formed on the surface was analyzed.

The contact angle θ to water was 118°, whereby it was confirmed that a water repellent film was formed on the sample surface (θ=97°). As a result of the XPS analysis, a peak (292 eV) attributable to $(CF_2)_n$ was observed, whereby it was confirmed that the formed water repellent film had a polytetrafluoroethylene structure, and its film thickness was at least 50 Å.

EXAMPLES 7 AND 8

Surface treatment of the synthetic resin samples as identified in Table 1 was conducted in the same manner as in Example 6. In each case, a water repellent polytetrafluoroethylene film was formed. The results of measurement of the contact angles θ to water are shown in Table 1.

EXAMPLE 9

A sample of a polypropylene sheet was put into a reactor resistant to fluorine, and the reactor was evacuated under vacuum. Then, fluorine gas diluted to 10 wt % with nitrogen, was introduced to 760 Torr. The reaction system was left to stand stil at room temperature for one hour. Then, the fluorine gas was discharged under vacuum, and then a gas mixture of tetrafluoroethylene (TFE) and hexafluoropropylene (HFP) (TFE/HFP=360/400 Torr) was introduced to 760 Torr. The system was left to stand stil at 90° C. for one hour. Then, it was returned to room temperature, and an unreacted gas mixture was replaced by nitrogen gas. The nitrogen gas was again discharged under vacuum. Then, to substitute the polymer terminals with fluorine, fluorine gas diluted to 10 wt % with nitrogen, was introduced to 360 Torr, and the system was left to stand stil for 15 minutes. Finally, the fluorine gas was replaced by nitrogen, the sample was taken out, and the film formed on the surface was analyzed.

The contact angle θ to water was 118°, whereby it was confirmed that a water repellent film was formed on the sample surface (=97°). As a result of the XPS analysis, a peak (292 eV) attributable to $(CF_2)_n$ and a peak (293 eV) attributable to $CF_3$ were observed, and from the intensity ratio, it was confirmed that a copolymer film of HFP/TFE =0.16 was formed.

EXAMPLE 10

A sample of a polyethylene sheet was put into a reactor resistant to fluorine, and the reactor was evacuated under vacuum. Then, fluorine gas diluted to 10 wt % with nitrogen, was introduced to 760 Torr. The system was left to stand stil at room temperature for one hour. Then, the fluorine gas was discharged under vacuum. Then, acrylonitrile gas was introduced to 140 Torr, and nitrogen gas was added to bring the pressure to 1 atm. The system was left to stand stil at room temperature for one hour. Then, unreacted acrylonitrile gas was replaced by nitrogen gas. Then, the sample was taken out, and the film formed on the surface was analyzed.

The contact angle θ to water was 75°, whereby it was confirmed that an acrylonitrile film was formed on the sample surface (θ=96°). As a result of the XPS analysis, a peak (401 eV) attributable to -CN was observed, whereby it was confirmed that the formed film had an acrylonitrile structure, and its film thickness was at least 50 Å.

EXAMPLE 11

Surface treatment of PET was conducted in the same manner as in Example 10. Also in this case, a peak attributable to —CN group was observed as a result of the XPS analysis, whereby it was confirmed that the formed film had an acrylonitrile structure, and its film thickness was at least 50 Å. The results of measurement of the contact angles θ to water are shown in Table 1.

EXAMPLE 12

A sample of a polycarbonate was put into a reactor resistant to fluorine, and the reactor was evacuated under vacuum. Then, fluorine gas diluted to 10 wt % was introduced at room temperature to 120 Torr. The reaction system was left to stand still at room temperature for 20 minutes. Then, the fluorine gas was discharged under vacuum. Then, tetrafluoroethylene gas was introduced to 760 Torr. The system was left to stand still at 100° C. for 15 minutes and then returned to room temperature. Then, unreacted tetrafluoroethylene gas was replaced by nitrogen gas. The nitrogen gas was again discharged under vacuum. Then, to substitute the polymer terminals with fluorine, fluorine gas diluted to 10 wt % with nitrogen, was introduced to 100 Torr, and the system was left to stand still for 5 minutes. Finally, the fluorine gas was replaced by nitrogen, then the sample was taken out, and the film formed on the surface was analyzed.

The contact angle θ to water was 159°, whereby it was confirmed that a water repellent film was formed on the sample surface (θ=80°). As a result of the XPS analysis, a peak (292 eV) attributable to $(CF_2)_n$ was observed, whereby it was confirmed that the formed water repellent film had a polytetrafluoroethylene structure, and its film thickness was at least 50 Å.

EXAMPLE 13

Surface treatment of a polyethylene sheet was conducted in the same manner as in Example 12, whereby the contact angle θ to water was 162°, and it was confirmed that a water repellent film was formed on the sample surface (θ=93°).

COMPARATIVE EXAMPLE 1

A sample of a polypropylene sheet was put into a reactor resistant to fluorine, and the reactor was evacuated under vacuum. Then, tetrafluoroethylene gas was introduced to 760 Torr. The reaction system was left to stand still at 70° C. for one hour and then returned to room temperature, and unreacted tetrafluoroethylene gas was replaced by nitrogen gas. The nitrogen gas was again discharged under vacuum. Then, to substitute the polymer terminals with fluorine, fluorine gas diluted to 10 wt % with nitrogen, was introduced to 360 Torr, and the system was left to stand still for 15 minutes. Finally, the fluorine gas was replaced by nitrogen, then sample was taken out and the surface of the polypropylene sheet was analyzed.

The contact angle θ to water was 80°, whereby it was confirmed that a water repellent film was not formed on the sample surface (θ=97°).

COMPARATIVE EXAMPLE 2

A sample of a polyethylene sheet was put into a reactor, and the reactor was evacuated under vacuum. Then, acrylonitrile gas was introduced to 140 Torr. Further, nitrogen gas was added to bring the pressure to 760 Torr. Then, the system was left to stand still at room temperature for one hour. Unreacted acrylonitrile gas was replaced by nitrogen, then the sample was taken out, and the surface of the polyethylene sheet was analyzed.

The contact angle θ to water was 96°, and as a result of the XPS analysis, no peak attributable to nitrogen was observed, whereby it was confirmed that an acrylonitrile film was not formed on the sample surface.

According to the present invention, a functional group-containing polymer film having a uniform optional thickness can be coated on a wide range of synthetic resin materials by a simple process without requiring a special apparatus or a large energy, and if a plurality of monomers are employed, it is possible to form a multilayer structure. Thus, the industrial significance of the present invention is substantial.

EXAMPLE 14

A sample of a polyethylene sheet was put into a glass reactor, and the reactor was evacuated under vacuum. Then, the system was filled with nitrogen, and fluorine gas diluted to 10 wt % with nitrogen was introduced at a rate of 50 cc/min for 30 minutes. After the reaction, the fluorine gas was discharged under vacuum and replaced by nitrogen. Then, a styrene monomer liquid was introduced into the reactor until the sheet was almost completely immersed. The system was left to stand still at room temperature for 30 minutes. Then, the sample was taken out, washed with chloroform and deaerated under vacuum. Then, the film formed on the surface was analyzed.

The contact angle θ to water was 84° and from the FT-IR measurement, a peak attributable to the C—H bond of a benzene ring was observed at about 3,026 cm$^{-1}$, whereby it was confirmed that the formed film had a polystyrene structure.

EXAMPLE 15

Surface treatment of a polyethyelene sheet was conducted in the same manner as in Example 1 except that methyl acrylate was used as the monomer. The contact angle θ to water was 73°, and from the FT-IR measurement, a peak attributable to a carbonyl group was observed at about 1,700 cm$^{-1}$, whereby it was confirmed that the formed film had a methyl acrylate structure.

EXAMPLE 16

Surface treatment of a polyethylene sheet was conducted in the same manner as in Example 14 except that a compound as identified in Table 1 ($CH_2$=$CHCO_2C_2H_4(CF_2)_6F$) was used as the monomer. The contact angle θ to water was 112°, and from the XPS analysis, a peak (292 eV) attributable to $(CF_2)_n$ was observed, whereby it was confirmed that the formed water repellent film had a fluoroalkyl chain, and its film thickness was at least 50 Å.

TABLE 1

| Example Nos. | Synthetic resin samples | Monomers | Contact angle θ (°) Untreated | Contact angle θ (°) Surface-treated | Film formation |
|---|---|---|---|---|---|
| Example 1 | PP | TFE | 97 | 118 | ○ |
| Example 2 | PE | TFE | 96 | 118 | ○ |
| Example 3 | PET | TFE | 72 | 117 | ○ |
| Example 4 | PEEK | TFE | 90 | 118 | ○ |
| Example 5 | PI | TFE | 73 | 118 | ○ |
| Example 6 | PP | TFE | 97 | 118 | ○ |
| Example 7 | PE | TFE | 96 | 120 | ○ |
| Example 8 | Epoxy resin | TFE | 70 | 116 | ○ |
| Example 9 | PP | TFE/HFP | 97 | 118 | ○ |
| Example 10 | PE | Acrylonitrile | 96 | 75 | ○ |
| Example 11 | PET | Acrylonitrile | 72 | 75 | ○ |
| Example 12 | PC | TFE | 80 | 159 | ○ |
| Example 13 | PE | TFE | 93 | 162 | ○ |
| Example 14 | PE | Styrene | 93 | 84 | ○ |
| Example 15 | PE | Methacrylic acid | 93 | 73 | ○ |
| Example 16 | PE | $CH_2$=$CHCO_2C_2H_4(CF_2)_6F$ | 93 | 112 | ○ |
| Comparative Example 1 | PP | TFE | 97 | 80 | X |
| Comparative Example 2 | PE | Acrylonitrile | 96 | 96 | X |

Various symbols in Table 1 have the following meanings:

○: Good
X: Poor
PP: Polypropylene
PE: Polyethylene
PET: Polyethyleneterephthalate
PEEK: Polyether ether ketone
PI: Polyimide ("Capton" tradename, manufactured by DuPont, U.S.A.)
PC: Polycarbonate
TFE: Tetrafluoroethylene
HFP: Hexafluoropropylene

We claim:

1. A process for producing a surface-modified molded product of synthetic resin, which consists essentially of:
   (i) contacting a gas containing fluorine gas in an amount of no more than 20% weight with the surface of a molded product of synthetic resin to form radical reactive sites thereon; and then
   (ii) contacting a radical polymerizable monomer with the Alfrey-Price's value e as an index of the reactivity of the monomer being 1.7>e>−1.0 thereto to form a polymer layer having a thickness of from 1 Å to 500 μm initiated by said radical reactive sites on the surface of the molded product.

2. The process according to claim 1, wherein the gas containing fluorine gas contains fluorine gas in an amount of from 0.1 to 20 wt %.

3. The process according to claim 1, wherein the gas containing fluorine gas contains fluorine gas in an amount of from 1 to 20 wt %.

4. The process according to any one of claims 1 to 3, wherein the gas containing fluorine gas is contacted with the surface of a molded product at a temperature of from 0° to 80° C.

5. The process according to claim 1, wherein the polymerizable monomer is a fluorine-containing olefin.

6. The process according to claim 1, wherein the polymerizable monomer is derived from acrylic acid.

* * * * *